United States Patent
Love et al.

(10) Patent No.: US 7,178,796 B2
(45) Date of Patent: Feb. 20, 2007

(54) RATE STIFFENING JOUNCE BUMPER ASSEMBLY

(75) Inventors: Mickey L. Love, Londonderry, NH (US); Laurie Jean Schleck, Candia, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/998,534

(22) Filed: Nov. 29, 2004

(65) Prior Publication Data

US 2006/0113718 A1    Jun. 1, 2006

(51) Int. Cl.
F16F 1/36 (2006.01)
B60G 11/22 (2006.01)

(52) U.S. Cl. .................. 267/292; 267/140; 267/141.4; 267/153

(58) Field of Classification Search ......... 280/124.177; 267/220, 292, 293, 140, 136, 141.4, 152, 267/153, 201; 114/219; F16F 1/57, 1/36
See application file for complete search history.

(56) References Cited

U.S. PATENT DOCUMENTS

| | | |
|---|---|---|
| 3,266,139 A | 8/1966 | Adams |
| 3,338,542 A | 8/1967 | Meinhard |
| 3,622,194 A | 11/1971 | Bryk |
| 3,809,427 A | 5/1974 | Bennet |
| 3,922,730 A | 12/1975 | Winslow |
| 4,256,292 A | 3/1981 | Sullivan, Jr. et al. |
| 4,720,075 A | 1/1988 | Peterson et al. |
| 4,804,169 A | 2/1989 | Hassan |
| 4,805,886 A | 2/1989 | Hassan |
| 4,921,203 A | 5/1990 | Peterson et al. |
| 5,178,433 A | 1/1993 | Wagner |
| 5,308,048 A | 5/1994 | Weaver et al. |
| 5,467,970 A | 11/1995 | Ratu et al. |
| 5,487,535 A | 1/1996 | Carter et al. |
| 5,725,203 A | 3/1998 | Lloyd |
| 5,799,930 A | 9/1998 | Willett |
| 5,941,511 A | 8/1999 | Dawda et al. |
| 6,113,084 A | 9/2000 | Norkus et al. |
| 6,158,726 A * | 12/2000 | Coleman et al. ............ 267/292 |
| 6,254,072 B1 | 7/2001 | Bono et al. |
| 6,364,296 B1 | 4/2002 | Cummings et al. |
| 6,485,008 B1 | 11/2002 | Griffin |
| 2003/0226556 A1* | 12/2003 | Leven .................... 124/89 |

FOREIGN PATENT DOCUMENTS

JP    2000088027    * 3/2000

* cited by examiner

*Primary Examiner*—Devon Kramer
(74) *Attorney, Agent, or Firm*—Ronald W. Wangerow; Harness, Dickey & Pierce, P.L.C.

(57) ABSTRACT

The present invention provides a rate stiffening jounce bumper assembly, including a cup member having a large-headed mushroom stud which is inserted into the cup-shaped member and overmolded with an elastomeric bumper material. The head portion of the mushroom stud forms a shelf against which the bumper material is compressed such that the head portion effectively shortens the bumper spring thereby providing a stiffer spring rate to be obtained with a taller jounce bumper assembly.

13 Claims, 1 Drawing Sheet ical. Additionally, the bumper 36 can be formed of a material including solid and foamed elastomeric mate-

RATE STIFFENING JOUNCE BUMPER ASSEMBLY

FIELD OF THE INVENTION

The present invention relates to suspension systems for motor vehicles, and more particularly to a rate stiffening jounce bumper assembly for a suspension system of a motor vehicle.

BACKGROUND OF THE INVENTION

Jounce bumpers are often mounted on a vehicle, as shown in U.S. Pat. No. 5,725,203, where the jounce bumper is free standing to prevent a control arm of the suspension from impacting with the vehicle frame.

Jounce bumpers can be mounted in a free state or with a rigid cup. Commonly assigned U.S. Pat. No. 6,158,726 discloses a jounce bumper with the use of a rigid cup that is designed to be attached to the vehicle frame. The rigid cup acts to attach the jounce bumper to the vehicle (or alternatively the strut) and limits the jounce bumper distortion, thereby increasing its spring rate. The force necessary to compress the jounce bumper increases as the jounce bumper is compressed and the jounce bumper absorbs energy as it is being compressed. As the jounce bumper is compressed, the resistance to compression increases to the point where the jounce bumper acts as a solid, and transfers the remaining energy from the impact to the vehicle. The use of a rigid cup or another constraint limits the bulging of the bumper, thereby reducing the amount of travel needed to reach the point where the bumper becomes a solid. In general, when more energy must be removed, a larger bumper is used.

In some applications, it is necessary to provide a taller bumper in order to limit motion of the suspension control arm. Yet, with a taller jounce bumper, sometimes it is also desirable to maintain the stiffer spring rate of a shorter jounce bumper. Accordingly, it is desirable to provide a jounce bumper that can be made to be taller while maintaining the stiffer spring rate of a shorter jounce bumper.

SUMMARY OF THE INVENTION

The present invention provides a jounce bumper assembly, including a generally cup-shaped member having a base portion and a sidewall portion extending from the base portion for defining a cavity therein. The base portion includes a mounting aperture therein with a stud extending through the mounting aperture and having a shoulder disposed against the base portion and a radially extending head portion spaced from the shoulder and disposed in the cavity. A bumper is molded within the generally cup-shaped member and extends around the head portion with the head portion of the stud being disposed within the bumper and being effective to shorten the effective spring portion of the bumper in order to make the bumper stiffer despite its taller construction. Additionally, the bumper is made taller without the need for additional components and attachments such as an external spacer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
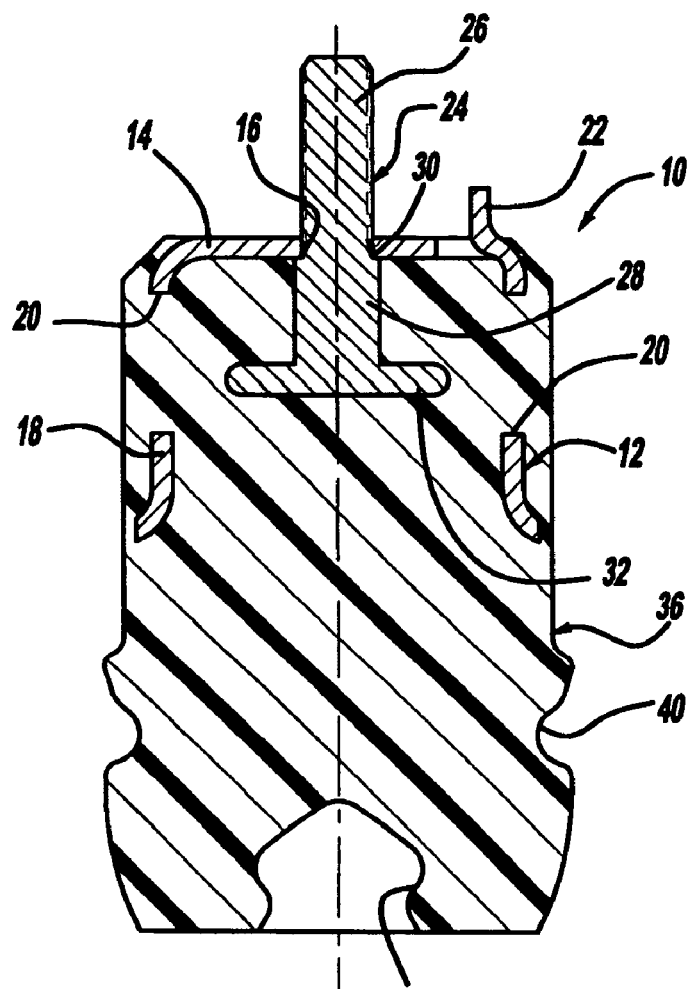
FIG. 1 is a cross-sectional view of a jounce bumper assembly according to the principles of the present invention.
Figure 3:
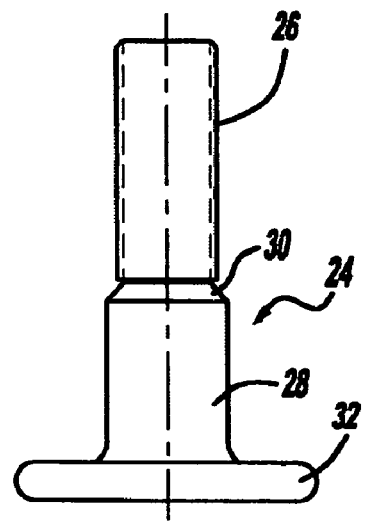
FIG. 3 is a side-plan view of the mushroom stud according to the principles of the present invention.
Figure 2:
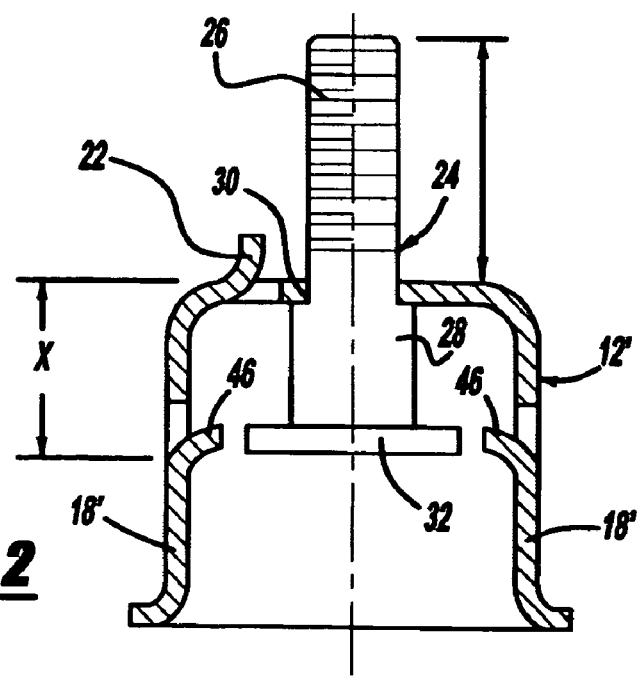
FIG. 2 is a cross-sectional view of a cup member and mushroom stud according to the principles of the present invention.

With reference to FIGS. 1–3, the jounce bumper assembly 10 according to the principles of the present invention will now be described. The jounce bumper 10 includes a generally cup-shaped member 12 having a base portion 14 with a central aperture 16 and a generally cylindrical sidewall portion 18 extending from the base portion 14. The sidewall portion 18 includes a plurality of apertures 20 symmetrically spaced around a perimeter of the cylindrical sidewall 18. A locator tab or projection 22 is formed by lancing the base portion 14 and bending the tab outward. A mushroom stud 24 is provided including a threaded shank portion 26, a stem portion 28 having a shoulder 30 disposed between the threaded shank portion 26 and the stem portion 28. A head portion 32 is provided at the end of the stem portion 28.

With the mushroom stud 24 inserted into the aperture 16 in the base 14 of the generally cup-shaped member 12, the elastomeric bumper 36 is molded within the generally cup-shaped member 12 so as to surround the stem 28 and head 32 of the mushroom stud 24. Additionally, the molded bumper 36 may pass through the apertures 20 provided in the sidewalls of the generally cup-shaped member 12. The bumper 36 extends from the generally cup-shaped member 12 a pre-determined distance and can be provided with a bore 38 in an end portion thereof as well as recessed grooves 40 provided in the side surface thereof which are specifically designed to provide a desired spring rate that is tuned to the specific vehicle application. In particular, the bore 38 and recessed grooves 40 can be tuned to provide an initial low spring rate as desired, with the spring rate increasing while the bumper 36 is being compressed.

The head 32 of the mushroom stud 24 effectively shortens the length of the bumper 36 by providing a shelf against which the bumper material is compressed. Thus, the mushroom stud 24 allows the jounce bumper 10 to be taller while maintaining a stiffer rate of a shorter jounce bumper. The length of the stem portion 28 of the mushroom stud can be increased or decreased in order to alter the spring rate of the jounce bumper 10. It should be noted that although the stem portion 28 is shown to have a smaller diameter than the head portion 32, the stem portion 28 can also have an equal diameter to the head portion 32. However, for weight reduction purposes, it is desirable to reduce the size of the stem portion 28 so as to be smaller than the head portion 32 while still maintaining an appropriate shoulder 30 for engaging the base portion 14 of the generally cup-shaped member 12. It is anticipated that the elastic bumper 36 can be formed of a material including solid and foamed elastomeric materials, including rubber, solid or foamed elastomers, urethanes, or flexible resilient plastic materials, etc.

Preferably, the stem portion 28 of the mushroom stud 24 has a length that is greater than one-tenth of the total height of the bumper 36. Alternatively, the stem 28 preferably has a length between one-third and two-thirds the height of the generally cup-shaped member 12. However, it should be understood that depending upon various vehicle parameters, other dimensions may be utilized. Furthermore, it is preferable that the width of the mushroom stud 24 is greater than at least half the diameter of the interior of the sidewall portion 18 of the generally cup-shaped member 12. Thus, the head 32 of the mushroom stud 24 provides a sufficient shelf for the bumper 36 to be compressed against in order to reduce the spring rate of the bumper 36.

With reference to FIG. 2, the generally cup-shaped member 12 can also be provided with radially inwardly extending tabs 46 which are lanced from the sidewall portion 18 and are bent radially inward so as to be adjacent to the head portion 32 of the mushroom stud 24. Thus, the radially inwardly extending tabs 46 also serve to define a shelf to effectively shorten the amount of bumper material 36 that is compressed and thereby reduce the spring rate of the bumper. It should be noted that although the bumper 36 has been disclosed as being molded into the generally cup-shaped member 12, the bumper 36 can also be formed separately and inserted into the generally cup-shaped member 12 and retained therein by adhesives or inwardly extending tabs of the cup member.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A jounce bumper assembly comprising:
    a generally cup-shaped member having a base portion and a sidewall portion extending from said base portion and defining a cavity, said base portion including a mounting aperture therein;
    a stud extending through said mounting aperture and having a shoulder including an axially directed face disposed against said base portion and a radially extending head portion axially spaced from said axially directed face of said shoulder and disposed in said cavity, said head portion having a diameter larger than a diameter of said shoulder;
    a bumper molded within said generally cup-shaped member and extending around said head portion, said bumper extending from said cup.

2. The jounce bumper assembly of claim 1, wherein said head portion has a diameter equal to at least one half a diameter of said sidewall portion.

3. The jounce bumper assembly of claim 1, wherein a top surface of said head portion is spaced from said base portion by a distance between one-third and two-thirds of a height of said generally cup-shaped member.

4. The jounce bumper assembly of claim 1, wherein said sidewall portion of said generally cup-shaped member has a plurality of openings therein.

5. The jounce bumper assembly of claim 1, wherein said generally cup-shaped member includes a plurality of radially inwardly extending tabs disposed adjacent to said head portion of said stud.

6. The jounce bumper assembly of claim 1, wherein said generally cup-shaped member is made from metal.

7. The jounce bumper assembly of claim 1, wherein said bumper is formed of a material selected from at least one of a group consisting of solid and foamed elastomeric materials.

8. A jounce bumper assembly for a wheel suspension system of a vehicle including a frame member and a strut member displaceable relative to said frame member along a line of travel, comprising:
    a generally cup-shaped member having a base portion and a sidewall portion extending from said base portion and defining a cavity, said base portion including a mounting aperture therein;
    a stud extending through said mounting aperture and having a shoulder including an axially directed face disposed against said base portion and a head portion axially spaced from said shoulder and having a surface facing in an opposite direction from said axially directed face of said shoulder and disposed in said cavity, a top surface of said head portion being axially spaced from said base portion by a distance between one-third and two-thirds of a height of said generally cup-shaped member;
    a bumper disposed within said generally cup-shaped member and extending around said head portion, said bumper extending from said cup-shaped member.

9. The jounce bumper assembly of claim 8, wherein said head portion has a diameter equal to at least one half a diameter of said sidewall portion.

10. The jounce bumper assembly of claim 8, wherein said sidewall portion of said generally cup-shaped member has a plurality of openings therein.

11. The jounce bumper assembly of claim 8, wherein said generally cup-shaped member includes a plurality of radially inwardly extending tabs disposed adjacent to said head portion of said stud.

12. The jounce bumper assembly of claim 8, wherein said generally cup-shaped member is made from metal.

13. The jounce bumper assembly of claim 8, wherein said bumper is formed of a material selected from at least one of the group consisting of solid and foamed elastomeric materials.

* * * * *